(12) United States Patent
Brenner et al.

(10) Patent No.: US 6,481,113 B1
(45) Date of Patent: Nov. 19, 2002

(54) ICE SKATE BLADE GAUGE

(75) Inventors: Sebastian Brenner, Croydon, PA (US); Michael J. Iorio, Croydon, PA (US)

(73) Assignee: EdgeInspector, Inc., Croydon, PA (US)

( * ) Notice: Subject to any disclaimer, the term of this patent is extended or adjusted under 35 U.S.C. 154(b) by 0 days.

(21) Appl. No.: 09/912,026

(22) Filed: Jul. 24, 2001

(51) Int. Cl.[7] ............... G01B 3/56; G01B 5/24
(52) U.S. Cl. ............... 33/535; 33/533; 280/809
(58) Field of Search ............... 33/535, 1 N, 1 BB, 33/3 R, 3 A, 530, 533, 534, 538, 650, 679.1; 280/809

(56) References Cited

U.S. PATENT DOCUMENTS

| | | | | |
|---|---|---|---|---|
| 3,606,686 A | * | 9/1971 | Righter | 33/535 |
| 4,161,822 A | | 7/1979 | Ayvazian | |
| 5,133,135 A | * | 7/1992 | Durfee, Jr. | 33/535 |
| 5,345,688 A | | 9/1994 | Allen | 33/535 |
| 5,625,958 A | * | 5/1997 | DeCoursey et al. | 33/1 BB |

* cited by examiner

*Primary Examiner*—Christopher W. Fulton
(74) *Attorney, Agent, or Firm*—Howson and Howson

(57) ABSTRACT

An accurate, portable skate blade gauge comprises an extruded body having a blade-receiving recess, a clamping screw for pressing the blade against a side wall of the recess, and a pivoted indicator arm having a base near the pivot for engagement with the blade edge, and a pointer remote from the pivot for indicating squareness of the blade. The pivot is a resilient pin of spring metal disposed in a hole in the gauge body and fixed to the bottom of the hole. A clearance between the pin and the wall of the hole allows the pin to flex when the skate blade is pressed against the base of the indicator. The resilience of the pin ensures that the blade remains in firm contact with the base of the indicator arm to achieve precise and accurate measurements.

11 Claims, 3 Drawing Sheets

ICE SKATE BLADE GAUGE

SUMMARY OF THE INVENTION

This invention relates to gauges and, more particularly, to a gauge for determining the squareness of the edge of an ice skate blade.

An ice skate blade is sharpened by a grinding wheel on an axis of rotation parallel to the longitudinal direction of the ice skate blade. Consequently, the blade edge takes the form of a shallow, concave surface. The blade has two, parallel, planar sides terminating in narrow parallel ridges, the peaks of which define the opposite sides of the concave edge. The blade edge should be square with the sides of the blade. That is, any imaginary transverse line extending through, and in mutually perpendicular relationship with the peaks of the ridges, should also be perpendicular to the sides of the blade.

Unfortunately, with time and use, the blades lose their squareness. A minor deviation from squareness will neither be perceived by, nor have a significant effect on the performance of, a novice skater. However, surprisingly, a minor deviation from squareness in a skate blade, even a deviation so slight as not to be detectable visually, will impair the performance of an advanced skater.

To compensate for the deviation from squareness in his or her skate blade, the advanced skater is forced to lean to one side or the other. Excessive leaning and overcompensation significantly reduces mobility and increases the chance of falling. Ice skate blades should therefore be checked frequently to optimize performance and avoid the hazard of falling. An out of squareness condition at the edge of a blade also provides an indirect indication that the skate requires sharpening.

Various devices have been proposed to check the squareness of the edge of an ice skate blade. One such device, described in U.S. Pat. No. 5,345,688 to Allen, has a body, an arm pivotally attached to the body and a dial indicator mounted to the arm. Allen also describes a two-piece measuring device having a squaring frame which can be clamped to the skate blade, and a separate element which can be held to the blade by a magnet. The squareness of the blade edge is determined by reading the relationship of edges of the separate element against markings on the squaring frame.

Unfortunately, conventional blade squareness indicators are used primarily by professional sharpeners, and tend to be unwieldy, complex and expensive. Bringing one's ice skates to a professional sharpener for squareness checks is time consuming and impractical. Therefore, it is desirable to provide a device for checking the squareness of a blade which can be used easily and readily by the skaters themselves to check the squareness of their skate blades and to determine whether or not sharpening is needed.

It is also desirable to provide a simple, portable blade squareness indicator which is accurate and precise.

A gauge having a pivoted pointer with a blade edge-engaging surface would be an ideal blade squareness indicating device. However, no such device has achieved widespread use. The reason that no pivoted pointer gauge has achieved success may be related to the large amplification of movement needed to measure very small deviations from squareness. Even if care is taken to clamp an indicator having a pivoted pointer onto a skate blade, it is difficult to maintain a tight relationship between the blade edge and the blade edge-engaging surface of the pointer. Unless a tight relationship is maintained, the pointer will be able to rotate back and forth about its pivot. The indicating end of the pointer, being remote from the pivot, will be able to move through a considerable distance. The result would be an unacceptable ambiguity in the indication of blade squareness.

It is an object of this invention to provide an ice skate blade gauge, for use by a skater, which is inexpensive, simple in design, easily made and easy to use, and which provides a high degree of precision and accuracy in measurement of the squareness of the edge of an ice skate blade.

The gauge in accordance with the invention comprises a clamp, which is removably connectible in a fixed relationship with an ice skate blade, and an arm pivoted on the clamp for rotation about a pivot axis to which the arm extends transversely. The arm has a blade edge-engaging surface which is adjacent to the pivot axis. An indicator, remote from the pivot axis, cooperates with the arm to display the rotational position of the arm relative to the clamp.

The arm is pivoted on the clamp by a resilient pivot defining the location of the pivot axis. When the clamp is connected with the blade, the blade may press against the blade edge-engaging surface of the arm and urge the arm in a direction to exert a force on the pivot and move the pivot axis laterally. A reaction force exerted by the pivot as a result of the resilience of the pivot ensures firm contact between the blade edge and the blade edge-engaging surface of the arm.

A preferred gauge in accordance with the invention comprises a body having a recess extending from a first face of the body to a location within the interior of the body and extending from a second face on one side of the body to a third face on a side of the body opposite said one side. This construction provides a substantially U-shaped recess adapted to receive an ice skate blade. The recess has a side wall and a clamping means opposite the side wall of the recess, the clamping means extending into the recess for contacting a side of the ice skate blade and securing the ice skate blade against the side wall of the recess. An indicator arm is provided in contiguous, face-to-face relation to the second face of the body and extends in a direction parallel to the second face. The arm has a base engageable with the edge of an ice skate blade when the blade is received in the recess. The second face of the body and the indicator arm have cooperating markings and a pointer for indicating the squareness of the skate blade edge. A hole in the second face receives a spring pin. The hole extends from the second face into the body in a direction perpendicular to the second face, and has a bottom. The spring pin extends through the hole and pivotally attaches the indicator arm in contiguous relation to the second face of the body. The spring pin is connected to the body at the bottom of the hole and to the indicator arm outside the hole. A clearance is provided between the pin and the hole so that the pin can flex laterally, ensuring firm contact of the base of the indicator arm against the skate blade edge when the clamping means secures the body in a fixed relationship with the ice skate blade in the recess.

Preferably, the clamping means comprises a threaded fastener extending through a threaded hole in the body into the recess. Tightening of the fastener forces the skate blade against the side wall of the recess.

As following description will explain in detail, in the operation of the gauge, the blade-engaging surface of the pivoted indicator arm is held tightly against the blade edge by the resilience of the pivot pin, eliminating backlash in the movement of the pointer and ensuring a precise and accurate indication of squareness, or deviation from squareness in the ice skate blade.

Other objects, details and advantages of the invention will be apparent from the following detailed description, when read in conjunction with the drawings.

DETAILED DESCRIPTION OF THE DRAWINGS

The gauge, as shown in FIGS. 1–5, comprises a body 10, which is preferably an aluminum extrusion. An extrusion is preferred because it can be produced readily and requires a minimum of machining. The body has a first face 12 and a slot or recess 14 which extends from the face 12 to a location within the interior of the body. The width of the recess 14 is such that it is able to receive any ordinary ice skate blade, but the width of the recess should not greatly exceed the thickness of the largest ice skate blade with which the gauge is intended to be used.

Figure 1:
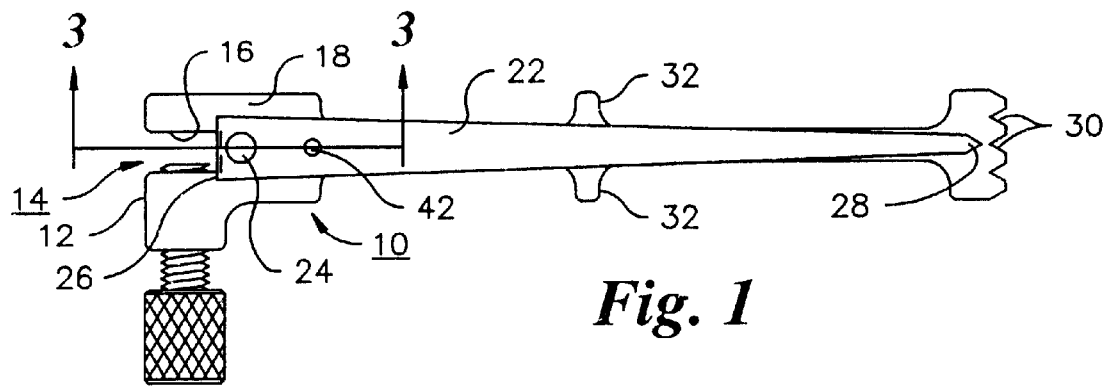
FIG. 1 is a top plan view of a preferred gauge in accordance with the invention.
Figure 2:
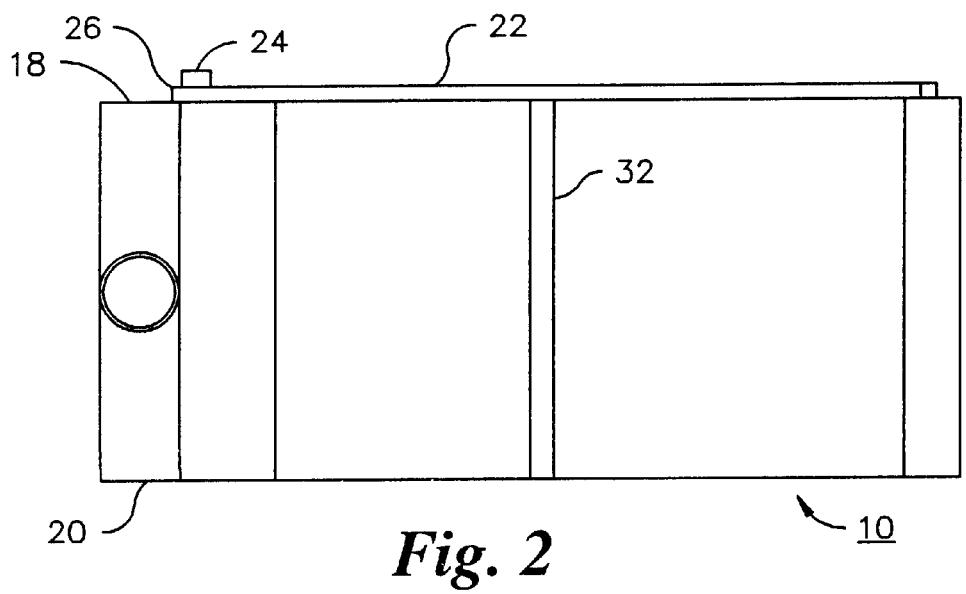
FIG. 2 is a front elevational view of the gauge.

The recess has a side wall 16, which is preferably perpendicular to face 12. As shown in FIG. 2, the body has a planar second face 18 on one side and a planar third face 20 on the side opposite to said one side.

An elongated indicator arm 22 is disposed in contiguous relationship with face 18. The indicator arm is pivoted on a pin 24 and has a base 26 in the form of a straight, planar surface adjacent to the pivot pin 24 and a pointer 28 at a location remote from the pivot pin. The pointer 28 cooperates with a series of notches 30 formed in the end of body 10 remote from face 12 to provide a visual indication of the position of the arm. The body 10 is provided with ribs 32 for facilitating handling of the gauge, and specifically to ensure that the gauge can be firmly engaged with an ice skate blade.

Figure 3:
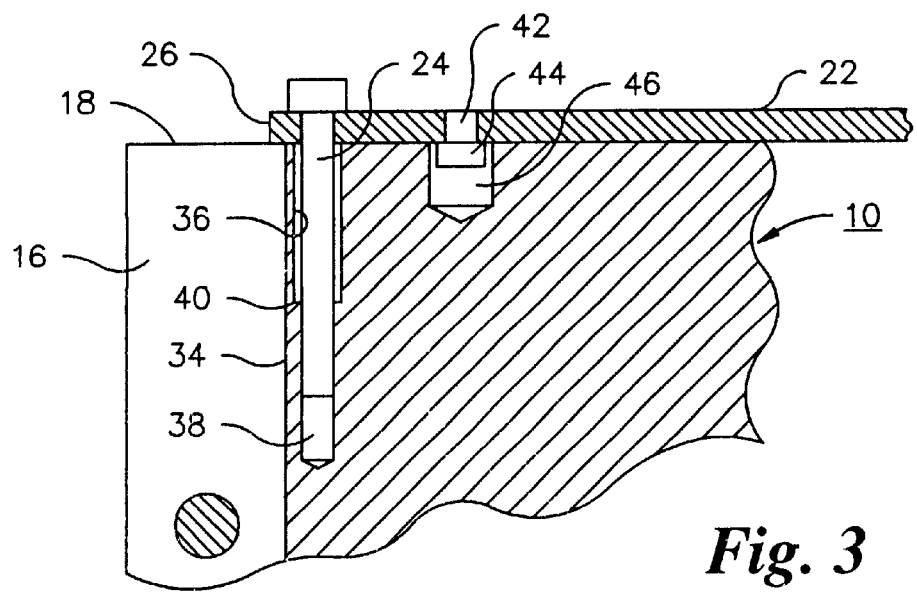
FIG. 3 is a fragmentary sectional view of the gauge taken on surface 3—3 of FIG. 1.

As shown in FIG. 3, the indicator arm 22 extends slightly beyond the end wall 34 of the recess so that it can engage a skate blade located in the recess. The pivot pin 24 is a resilient pin, preferably of spring or other resilient material. The pin is located in a hole 36, having a diameter larger than that of the pin, so that a clearance is provided, permitting flexing of the pin. The pin is press-fit into a narrower extension 38 at the bottom 40 of hole 36.

A limiter pin 42, having a head 44, is press-fit into indicator arm 22. The head cooperates with the side wall of a blind hole 46 formed in the body 10 to limit rotation of the indicator arm about the pivot axis. Preferably, the relationship of head 44 and hole 46 is such that the pointer 28 can move from a notch 30 at one end of the series of notches to the notch at the opposite end of the series, but not much farther.

Figure 4:
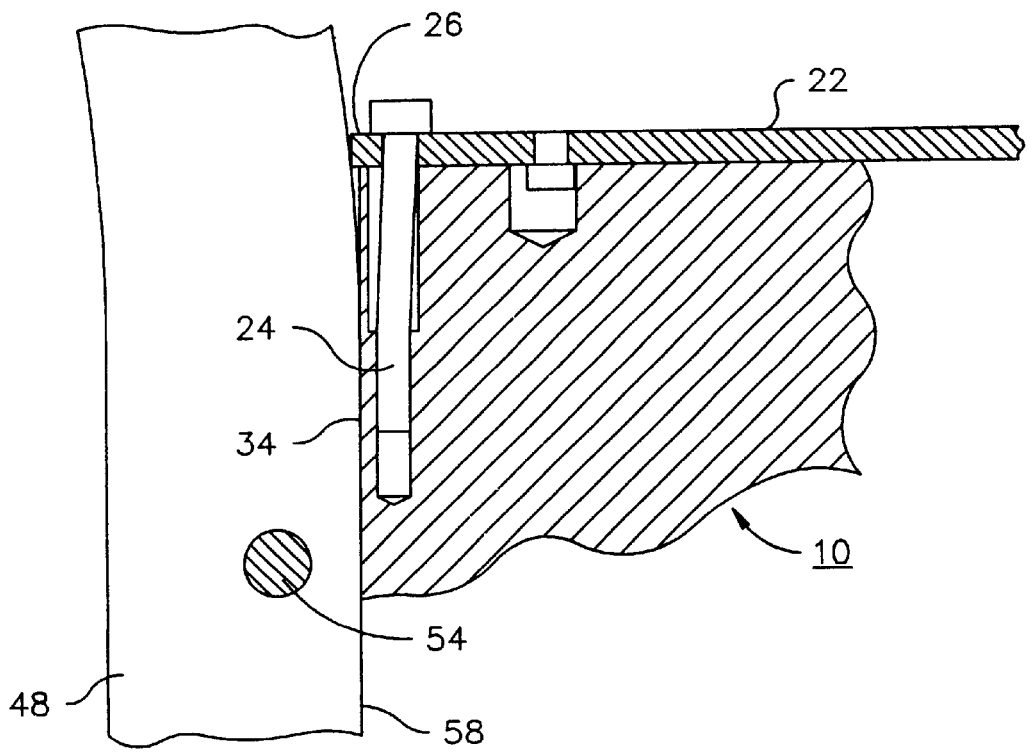
FIG. 4 is a similar sectional view, showing the gauge connected in fixed relationship with a skate blade.
Figure 5:
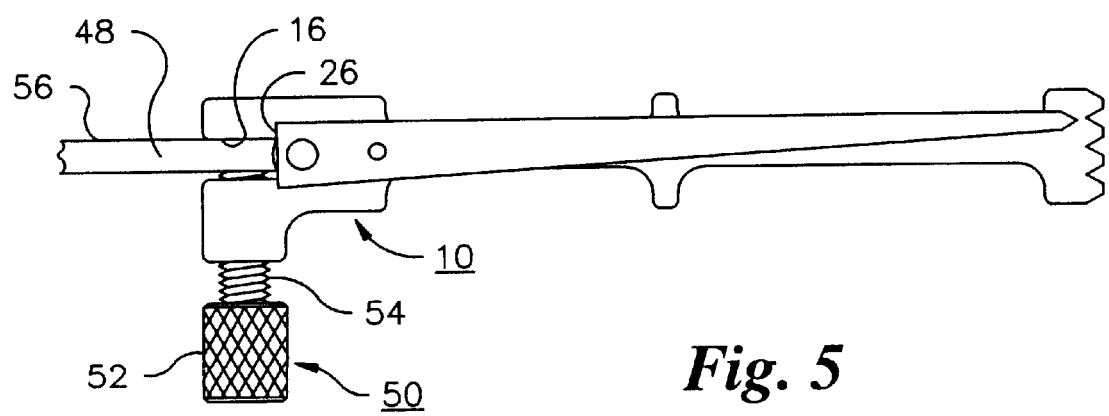
FIG. 5 is a top plan view showing the gauge connected with t e ice skate blade.

As shown in FIGS. 4 and 5, the body 10 can be attached to a skate blade 48 by a clamping screw 50, which has a knurled head 52 and a threaded shank 54 engaged with threads (not shown) in a through hole formed in the part of body 10 on the side of the recess 14 opposite the side wall 16. The clamping screw 50 extends transverse to side wall 16 of the recess 14. By tightening the clamping screw, the side 56 of skate blade 48 can be urged into face-to-face relationship with side wall 16 of the recess. When side 56 of the skate blade is in face-to-face relationship with side wall 16 of the recess, and pressed against the base 26 of the indicator arm, the pointer will move to a position in relation to the notches which indicates the deviation from squareness of the skate blade edge. Preferably, the indicator arm is configured so that, if the blade is perfectly square, the pointer points to the center notch of notches 30. In FIG. 5, the pointer is indicating a deviation from squareness.

As shown in FIG. 4, the edge 58 of the blade is in engagement with the end wall 34 of the recess. Even though the blade is slightly curved, because the indicator arm extends beyond end wall 34, when the skate blade is firmly pressed into the recess and into engagement with end wall 34, it pushes against the base 26 of the indicator arm 22, causing pin 24 to flex laterally. The engagement of the skate blade with the end wall 34 limits the flexing movement of the pivot pin.

When clamping screw 54 is tightened to secure the gauge body to the skate blade, the pin remains in its flexed condition, and its resilience holds the base of the indicator arm in firm engagement with the edge of the skate blade, thereby ensuring that the indicator arm cannot swing back or forth to provide a false indication. Thus, the indicator is able to provide an accurate and precise indication of any deviation from squareness in the skate blade. The gauge may be positioned and clamped at several locations along the length of the skate blade to check squareness at each such location.

Figure 6:
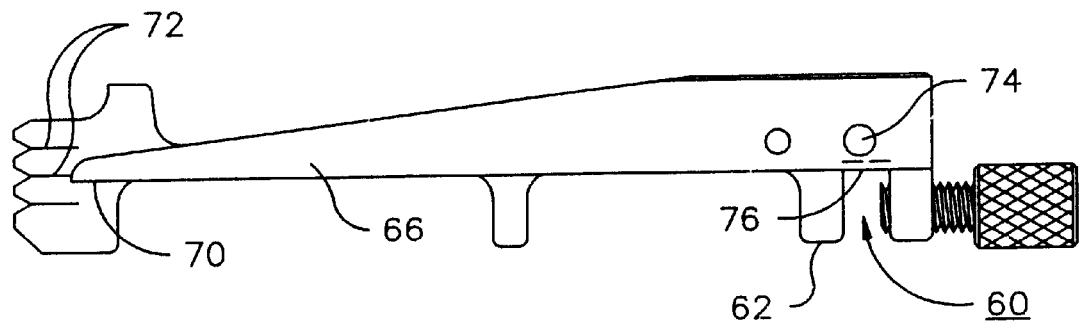
FIG. 6 is a top plan view of an alternative embodiment of the gauge.
Figure 7:
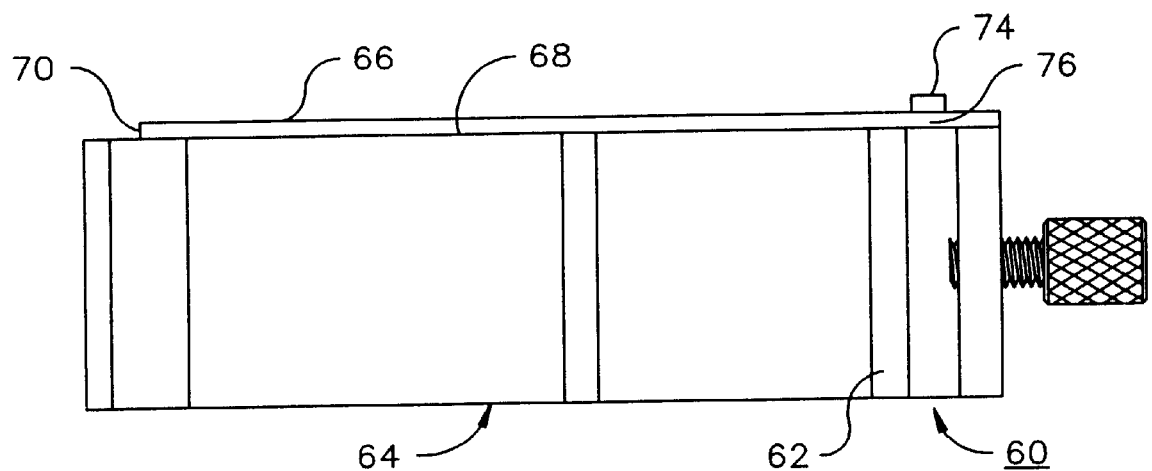
FIG. 7 is a front elevational view of the gauge of FIG. 6.

FIGS. 6 and 7 show an alternative embodiment of the gauge, in which a blade-receiving recess 60 extends inwardly from a face 62 of a body 64 in a direction perpendicular to the longitudinal direction of the indicator arm 66. The indicator arm 66 is disposed against a face 68 of the body, and its pointer 70 cooperates with engraved markings 72. The pivot pin 74 is disposed in a hole (not shown), similar to hole 36 in FIG. 3, providing a clearance allowing the pin to flex laterally when the skate blade is pushed into the recess 60 and into engagement with the base 76 of the indicator arm, the base in the case of FIGS. 6 and 7 being a portion of the side of the indicator arm adjacent the pivot pin 74. The operation of the gauge depicted in FIGS. 6 and 7 is substantially the same as that of the gauge of FIGS. 1–5. Although engraved markings are utilized, the indicator could be lengthened so that the pointer position is read against notches as in the case of FIG. 1.

The device can be used easily by a hockey player or figure skater to check the squareness of his or her skates, and determine whether or not sharpening is required.

Various modifications can be made to the gauge described above. For example, instead of using notches as markings against which the pointer position is read, the markings can be printed on, or etched or engraved in, the body. Alternatively, the pivoted indicator arm can be provided with an arc-shaped end instead of a pointer, and markings provided on the arc-shaped end of the arm can be read against a mark on the body.

Although it is desirable to provide the pivot pin in a hole in the body so that the indicator arm can be in face-to-face relationship with the body, it is possible to achieve some of the advantages of the invention by providing a resilient pivot which is not situated in a hole. For example, the pivot can be a resilient pin that extends outward from the body, and the markings against which the position of the indicator arm is read can be provided on a projecting portion of the body. Alternatively, although the resilient pin is simple and reliable, the pivot can be mounted on a movable, spring-loaded carrier.

In a further modification of the blade gauge, the clamping screw can be disposed on an oblique axis directed so that, as the clamping screw is tightened against the blade, the screw exerts a force urging the blade into the recess, so that the act of tightening the screw itself, rather than manual pushing of the blade into the recess, effects flexing of the pivot pin.

In both embodiments, the pivot pin and its surrounding hole are preferably coaxial for simplicity. However, a coaxial relationship is not essential; it is only necessary that the hole have a clearance permitting flexing of the pin in the direction in which the blade is pushed into the blade-receiving recess in the gauge body.

Still other modifications may be made to the apparatus described above without departing from the scope of the invention as defined in the following claims.

What is claimed is:

1. A gauge for checking the squareness of an ice skate blade comprising:
    a body having a recess extending from a first face of the body to a location within the interior of the body and extending from a second face on one side of the body to a third face on a side of the body opposite said one side, whereby the recess is a substantially U-shaped recess adapted to receive an ice skate blade, the recess having a side wall and a clamping means opposite the side wall of the recess, the clamping means extending into the recess for contacting a side of the ice skate blade and securing the ice skate blade against the side wall of the recess;
    an indicator arm contiguous to the second face of the body and extending in a direction parallel to the second face, the arm having a base engageable with a skate blade edge of the ice skate blade when the blade is received in the recess, the second face of the body and the indicator arm having cooperating markings and a pointer for indicating the squareness of the skate blade edge;
    a hole in the second face for receiving a spring pin, the hole extending from the second face into the body in a direction perpendicular to the second face, and having a bottom; and
    a spring pin extending through the hole and pivotally attaching the indicator arm in contiguous relation to the second face of the body, the spring pin being connected to the body at the bottom of the hole and being connected to the indicator arm outside the hole, a clearance being provided between the pin and the hole so that the pin can flex laterally, ensuring firm contact of the base of the indicator arm against the skate blade edge when the clamping means secures the body in a fixed relationship with the ice skate blade in said recess.

2. The gauge of claim 1, wherein the clamping means comprises a fastener extending into the recess for contacting one side of the ice skate blade, whereby tightening of the fastener forces the skate blade against the side wall of the recess.

3. The gauge of claim 1, wherein the clamping means comprises a through hole in the body, the through hole extending in a direction perpendicular to said side wall of the recess, and a fastener extending through the through hole and into the recess for contacting one side of the ice skate blade, whereby tightening of the fastener forces the skate blade against said side wall of the recess.

4. The gauge of claim 3, wherein the through hole and fastener are threaded, the threaded fastener being threaded into the threaded through hole, whereby tightening of the fastener forces the skate blade against said side face of the recess.

5. The gauge of claim 1, wherein the markings are spaced from the spring pin by a distance substantially greater than the distance between the spring pin and said base of the indicator arm.

6. The gauge of claim 5, wherein the markings are on the second face of the body.

7. A gauge for determining the squareness of an ice skate blade comprising:
    a clamp removably connectible in fixed relationship with an ice skate blade; and
    an arm pivoted on the clamp for rotation about a pivot axis to which the arm extends transversely, the arm having a blade edge-engaging surface adjacent to the pivot axis; and
    an indicator remote from the pivot axis and cooperating with the arm to display the rotational position of the arm relative to the clamp;
    wherein the arm is pivoted on the clamp by a resilient pivot defining the location of said pivot axis, whereby, when the clamp is connected with the blade, the blade may press against the blade edge-engaging surface of the arm and thereby urge the arm in a direction to exert a force on the pivot and move the pivot axis laterally, so that a reaction force exerted by the pivot as a result of the resilience of the pivot ensures firm contact between the blade edge and the blade edge-engaging surface of the arm while clamp is connected in fixed relationship with the blade.

8. The gauge of claim 7, wherein the pivot is a spring pin.

9. The gauge of claim 7, wherein the clamp and the indicator have cooperating markings for indicating the squareness of the ice skate blade.

10. The gauge of claim 9, wherein the markings are on the clamp.

11. The gauge of claim 7, wherein said resilient pivot is a pin, the clamp includes a hole for receiving said pin, the hole extends through the clamp along said pivot axis and has a bottom, and a clearance is provided between the pivot and the hole so that the pivot can flex laterally, ensuring firm contact between the blade edge and the blade edge-engaging surface of the arm.

* * * * *